US007948483B2

(12) United States Patent
Fujikawa

(10) Patent No.: US 7,948,483 B2
(45) Date of Patent: May 24, 2011

(54) PHOTO DETECTION CIRCUIT, METHOD OF CONTROLLING THE SAME, ELECTRO-OPTICAL PANEL, ELECTRO-OPTICAL DEVICE, AND ELECTRONIC APPARATUS

(75) Inventor: Shinsuke Fujikawa, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 923 days.

(21) Appl. No.: 11/198,333

(22) Filed: Aug. 8, 2005

(65) Prior Publication Data

US 2006/0077169 A1 Apr. 13, 2006

(30) Foreign Application Priority Data

Oct. 12, 2004 (JP) ................................ 2004-297210

(51) Int. Cl.
*G06F 3/038* (2006.01)

(52) U.S. Cl. ........................................................ 345/207

(58) Field of Classification Search ............ 345/87–107, 345/207; 257/461; 250/214
See application file for complete search history.

(56) References Cited

U.S. PATENT DOCUMENTS 4,714,827 A 12/1987 Akita
5,705,807 A 1/1998 Throngnumchai et al.
5,929,434 A * 7/1999 Kozlowski et al. ....... 250/214 A
6,087,703 A * 7/2000 Ohta et al. .................... 257/461
6,918,674 B2 * 7/2005 Drummond et al. .......... 359/604
7,145,546 B2 * 12/2006 Kang et al. .................... 345/102
2002/0050974 A1 * 5/2002 Rai et al. ........................ 345/102
2006/0007220 A1 * 1/2006 Perner ........................... 345/207
2006/0077169 A1 4/2006 Fujikawa

FOREIGN PATENT DOCUMENTS

JP A 61-167824 7/1986
JP U 400-1421 1/1992
JP 04172083 A * 6/1992
JP A 05-265401 10/1993
JP A 06-011713 1/1994
JP A-7-55946 3/1995
JP Y 07-054823 12/1995
JP A 08-122149 5/1996
JP A 2000-131137 5/2000
JP A-2009-112794 4/2006

OTHER PUBLICATIONS

Ukita, Masaaki "Quantum Counting Device" Mar. 3, 1995; Machine Translation of JP 07-055946 A.*

* cited by examiner

*Primary Examiner* — Chanh Nguyen
*Assistant Examiner* — Adam J Snyder
(74) *Attorney, Agent, or Firm* — Oliff & Berridge, PLC

(57) ABSTRACT

A photo detection circuit includes a photodiode whose cathode is connected to a high-potential-side power supply and whose anode is connected to a connection point; a capacitor element provided between the connection point and a low-potential-side power supply; and a switching element, provided between the connection point and the low-potential-side power supply, that switches on and off with a predetermined period. A voltage signal of the connection point is extracted as an output signal.

10 Claims, 12 Drawing Sheets

PHOTO DETECTION CIRCUIT, METHOD OF CONTROLLING THE SAME, ELECTRO-OPTICAL PANEL, ELECTRO-OPTICAL DEVICE, AND ELECTRONIC APPARATUS

This application claims the benefit of Japanese Patent Application No. 2004-297210, filed Oct. 12, 2004. The entire disclosure of the prior application is hereby incorporated by reference herein in its entirety.

BACKGROUND

The present invention relates to a photo detection circuit capable of detecting luminance, to a method of controlling the same, to an electro-optical panel, to an electro-optical device, and to an electronic apparatus.

A backlight is provided on a rear surface of a liquid crystal panel of a transmissive or transflective liquid crystal device. The liquid crystal panel modulates light emitted from the backlight. A plurality of pixels are formed in a matrix in the liquid crystal panel, and the transmittance of each pixel is adjusted to display an image. In such a liquid crystal device, the power consumption of the backlight is large. Accordingly, the photo detection circuit is provided in order to reduce the power consumption of the liquid crystal device, and the intensity of the backlight is adjusted according to the intensity of environmental light (for example, see Japanese Unexamined Patent Application Publication Nos. 5-265401 (Claim 1 and FIG. 2) and 6-11713 (Claim 1 and FIG. 1)). In addition, the photo detection circuit is formed on a glass substrate of the liquid crystal device in order to reduce the number of components (for example, see Japanese Unexamined Patent Application Publication No. 2000-131137).

Generally, a current must be extracted from a reverse-biased photodiode in the photo detection circuit as a signal. However, a space for disposing the photodiode within the liquid crystal device is limited, so that the signal current becomes small. Accordingly, it is preferable to extract it as a voltage having a value converted from the current. A method has been proposed in which a potential difference from the signal current is detected by providing a resistor suitable for extracting it as a voltage value.

However, the signal current of the photodiode is very small, so that the resistor must have a high resistance value in order to convert the signal current to a sufficient voltage value. A material having a low resistance value is basically used for a group of wiring lines on the glass substrate of the liquid crystal device, so that it is difficult to form a resistor having a suitable resistance value.

SUMMARY

An advantage of the invention is that it provides a photo detection circuit capable of exactly measuring an amount of environmental light from a minute signal current, an electro-optical device using the same, a method of controlling the same, and an electronic apparatus.

According to a first aspect of the invention, there is provided a photo detection circuit including: a photodiode whose cathode is connected to a high-potential-side power supply and whose anode is connected to a connection point; a capacitor element provided between the connection point and a low-potential-side power supply; and a switching element, provided between the connection point and the low-potential-side power supply, and that switches on and off with a predetermined period. In addition, a voltage signal of the connection point is extracted as an output signal.

According to this aspect, the photodiode becomes a reversed-biased state, so that it generates a current according to an amount of incident light. In addition, both terminals of the capacitor element are short-circuited with a predetermined period by the switching element, so that a voltage signal of the connection point becomes a signal indicating luminance. An output current of the photodiode is very small, so that a resistor having a high resistance value is required in order to generate a voltage signal using the resistor, which causes a circuit area to increase. On the contrary, when the capacitor element is employed, providing a capacitor element having a sufficiently low capacitance value is enough in charging the very small current. Accordingly, the circuit scale can be significantly reduced. In addition, since the resistor having a high resistance value serves as an antenna, a noise may be mixed. However, the photo detection circuit according to this aspect employs the capacitor element, so that the luminance can be exactly detected in a large noise margin.

Preferably, the photo detection circuit further includes a voltage-to-frequency converting circuit that converts the voltage signal to a frequency signal, and the frequency signal is output instead of the voltage signal as the output signal. In this case, since a frequency signal is output from the photo detection circuit, the noise margin is enhanced to facilitate handling the signal.

Preferably, the voltage-to-frequency converting circuit has a logic circuit that operates an logical multiplication between the voltage signal and a reference signal having a period shorter than the on/off period of the switching element to output a binarization signal, and the binarization signal is output as the frequency signal. By means of this structure, the binarization signal serving as the frequency signal can be output by the logic circuit, so that the structure can be simplified.

Preferably, the photo detection circuit includes a counter unit that counts the binarization signal to output a count data signal indicating a result of counts per unit time, and the count data signal is output as the output signal. In this case, it can be output as a digital signal.

According to a second aspect of the invention, there is provided an electro-optical panel including: the above-described photo detection circuit; a plurality of data lines; a plurality of scanning lines; a plurality of pixel circuits provided to correspond to intersections of the plurality of data lines and the plurality of scanning lines, and each including an electro-optical element having an optical characteristic changed by an electrical effect; and a driving circuit that outputs a signal to at least one of the plurality of data lines and the plurality of scanning lines to drive the electro-optical element. According to this aspect, the photo detection circuit is installed into the electro-optical panel, so that a device employing the electro-optical panel can be small-sized.

Further, according to a third aspect of the invention, there is provided an electro-optical device including: the above-described electro-optical panel; a light source that radiates light from one surface of the electro-optical panel toward the other surface; and a dimmer circuit that adjusts an amount of light emitted from the light source based on the output signal of the photo detection circuit. In addition, the electro-optical element is a liquid crystal element whose transmittance is changed in accordance with an applied voltage. According to this aspect, an amount of light emitted from the light source can be adjusted in accordance with environmental luminance detected by the photo detection circuit, so that the light-emitting luminance of the light source can increase at a bright place while the light-emitting luminance of the light source can decrease at a dark place. As a result, the screen can be displayed such that a user can see the image easily, and the power consumption can be reduced.

Further, according to a fourth aspect of the invention, there is provided an electro-optical device including: the above-described electro-optical panel; and an image processing circuit that outputs an image signal whose level is adjusted based on the output signal of the photo detection circuit. In addition, the electro-optical element is composed of a light-emitting element that emits light with a luminance according to a driving current, and the driving circuit controls the driving current based on the image signal output from the image processing circuit. According to this aspect, the level of the image signal can be adjusted in accordance with environmental luminance detected by the photo detection circuit, so that the luminance of the light-emitting element over the entire screen can increase at a bright place while the luminance of the light-emitting element over the entire screen can decrease at a dark place. As a result, the screen can be displayed such that the user can see the image easily, and the power consumption can be reduced. Furthermore, an organic light-emitting diode (OLED) element and an inorganic light-emitting diode element or the like are included in the light-emitting element.

Further, according to a fifth aspect of the invention, there is provided an electro-optical device including: the above-described electro-optical panel; and a power supply circuit that outputs a power supply voltage whose level is adjusted based on the output signal of the photo detection circuit. In addition, the driving circuit outputs to the data line a data signal according to a gray-scale level to be displayed, and the electro-optical element is composed of a light-emitting element that emits light with a luminance according to a driving current, and the pixel circuit has a driving transistor for supplying the driving current to the light-emitting element, and the driving transistor supplies to the light-emitting element the driving current having a level based on the power supply voltage and the data signal. According to this aspect, the power supply voltage can be adjusted in accordance with environmental luminance detected by the photo detection circuit, so that the luminance of the light-emitting element over the entire screen can increase at a bright place while the luminance of the light-emitting element over the entire screen can decrease at a dark place. As a result, the screen can be displayed such that the user can see the image easily, and the power consumption can be reduced.

Further, according to a sixth aspect of the invention, there is provided an electro-optical device including: a plurality of data lines; a plurality of scanning lines; a plurality of pixel circuits provided to correspond to intersections of the plurality of data lines and the plurality of scanning lines, and each including an electro-optical element having an optical characteristic changed by an electrical effect; a control circuit that generates a plurality of control signals; a driving circuit that generates a driving signal based on the plurality of control signals to output the driving signal to at least one of the data lines and the scanning lines; a photo detection circuit which includes a photodiode whose cathode is connected to a high-potential-side power supply and whose anode is connected to a connection point, a capacitor element provided between the connection point and a low-potential-side power supply, and a switching element, provided between the connection point and the low-potential-side power supply, that switches on and off based on a first signal, and the photo detection circuit that extracts a voltage signal from the connection point. In addition, the first signal serves as any one of the plurality of control signals. According to this aspect, the specific structure for generating the first signal becomes unnecessary, so that the structure can be simple to reduce a cost of the electro-optical device. Furthermore, when data lines, scanning lines, pixel circuits, a driving circuit, and a photo detection circuit are provided in the electro-optical panel, the number of input terminals of the electro-optical panel can decrease to cope with the narrow pitch.

According to a seventh aspect of the invention, there is provided an electro-optical device including: a plurality of data lines; a plurality of scanning lines; a plurality of pixel circuits provided to correspond to intersections of the data lines and the scanning lines, and each including an electro-optical element having an optical characteristic changed by an electrical effect; a control circuit that generates a plurality of control signals; a driving circuit that generates a driving signal based on the plurality of control signals to output the driving signal to at least one of the data lines and the scanning lines; and a photo detection circuit which includes a photodiode whose cathode is connected to a high-potential-side power supply and whose anode is connected to a connection point, a capacitor element provided between the connection point and a low-potential-side power supply, a switching element, provided between the connection point and the low-potential-side power supply, that switches on and off based on a first signal, and a logic circuit that operates a logical multiplication between the first signal and a second signal having a period shorter than a period of the first signal to output a binarization signal. The first and second signals serve as a portion of the plurality of control signals. According to this aspect, a specific structure for generating the first and second signals becomes unnecessary, so that the structure can be simple to reduce a cost of the electro-optical device. Furthermore, when data lines, scanning lines, pixel circuits, a driving circuit, and a photo detection circuit are provided in the electro-optical panel, the number of input terminals of the electro-optical panel can decrease to cope with the narrow pitch.

According to an eighth aspect of the invention, there is provide an electronic apparatus comprising the above-described electro-optical device. Examples of this electronic apparatus may include a personal computer, a cellular phone, a personal digital assistant or the like.

According to a ninth aspect of the invention, there is provided a method of controlling a photo detection circuit which includes a photodiode whose cathode is connected to a high-potential-side power supply and whose anode is connected to a connection point, and a capacitor element provided between the connection point and a low-potential-side power supply, the method including: short-circuiting both terminals of the capacitor element with a predetermined period; operating a logical multiplication between a reference signal having a period shorter than the predetermined period and a voltage signal of the connection point to generate a binarization signal; and outputting the binarization signal as a luminance signal indicating luminance. According to this aspect, when the photodiode generates a current in accordance with an amount of incident light, an electrical charge is charged in the capacitor element to increase a potential of the connection point. The potential of the connection point is reset with a predetermined period. The binarization signal obtained by executing logical multiplication between the reference signal and the voltage signal of the connection point has the number of pulses in accordance with a luminance per unit time. Accordingly, it is possible to convert the luminance to a frequency to be output.

BRIEF DESCRIPTION OF THE DRAWINGS

The invention will be described with reference to the accompanying drawings, wherein like numbers reference like elements, and wherein.

DETAILED DESCRIPTION OF EMBODIMENTS

First Embodiment

An electro-optical device according to a first embodiment of the present invention uses liquid crystal as an electro-optical material. The electro-optical device 1 has a liquid crystal panel AA (an example of an electro-optical panel) as a main body. The liquid crystal panel AA has an element substrate in which thin film transistors (hereinafter, referred to as TFTs) serving as switching elements are formed, a counter substrate, and liquid crystal held between the substrates with a constant gap interposed therebetween, such that electrodes are forming surfaces of the element substrate and the counter substrate opposite to each other.

Figure 1:
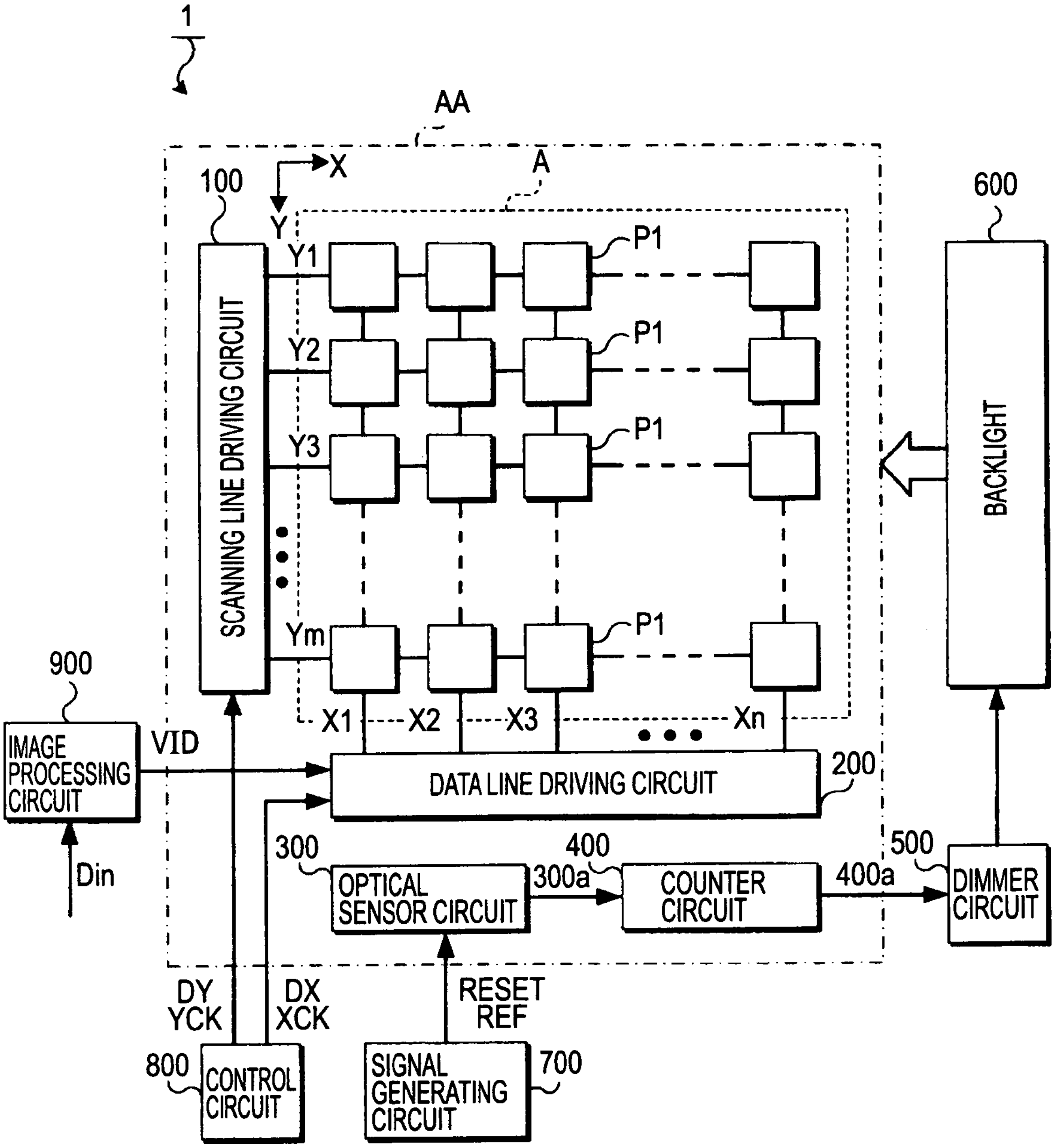
FIG. 1 is a block view illustrating the entire structure of an electro-optical device 1 according to a first embodiment of the present invention.

FIG. 1 is a block view illustrating the entire structure of the electro-optical device 1 according to the first embodiment. The electro-optical device 1 has a liquid crystal panel AA, a dimmer circuit 500, a backlight 600, a signal generating circuit 700, a control circuit 800, and an image processing circuit 900. The liquid crystal panel AA is a transmissive type, but may be a transflective type. The signal generating circuit 700 generates a reset signal RESET and a reference signal REF. These signals are used in a photo detection circuit 300. The liquid crystal panel AA includes an image display region A, a scanning line driving circuit 100, a data line driving circuit 200, a photo detection circuit 300, and a counter circuit 400 formed on the element substrate. The control circuit 800 generates an X transfer start pulse DX and an X clock signal XCK to supply them to the data line driving circuit 200 and generates a Y transfer start pulse DY and a Y clock signal YCK to supply them to the scanning line driving circuit 100. A plurality of pixel circuits P1 are formed in a matrix in the image display region A, and the transmittance can be controlled for each pixel circuit P1. Light emitted from the backlight 600 is emitted through the pixel circuits P1. As such, gray-scale level display using optical modulation can be made. The dimmer circuit 500 makes the backlight 600 emit light with a luminance according to luminance data 400*a*. Furthermore, the luminance data 400*a* is data indicating environmental luminance.

However, whether the displayed image can be clearly seen depends on the environmental brightness. For example, it is required to set the light-emitting luminance of the backlight 600 high to display a bright screen under natural daylight. On the contrary, the image can be clearly displayed even though the luminance of the backlight 600 is not as high as that in daylight under a dark environment at night. Accordingly, the light-emitting luminance of the backlight 600 is preferably adjusted in accordance with the luminance of the environmental light. The photo detection circuit 300 and the counter circuit 400 arranged in the liquid crystal panel AA are used for measuring the luminance of the environmental light.

Figure 2:
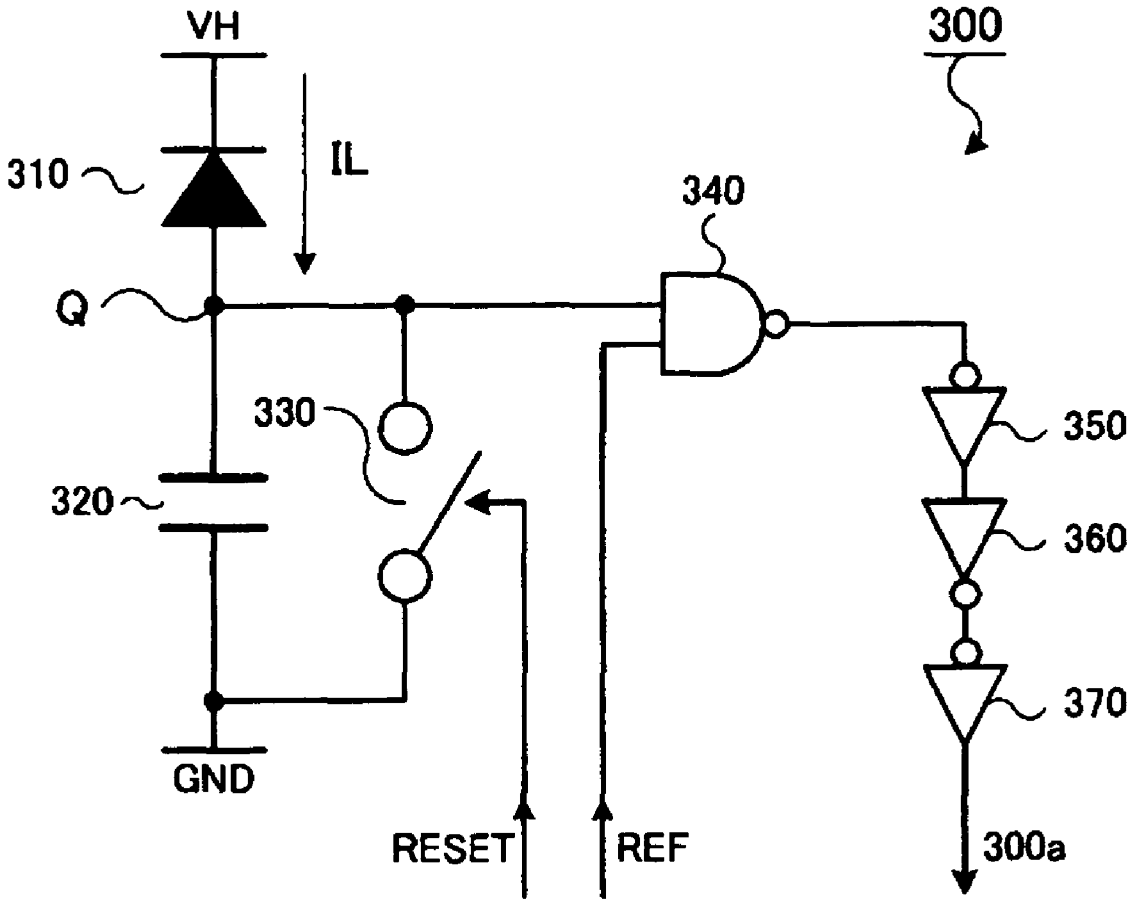
FIG. 2 is a block view illustrating an example of the structure of a photo detection circuit 300 of the electro-optical device.

FIG. 2 is a circuit diagram of the photo detection circuit 300. As shown in FIG. 2, a photodiode 310 and a capacitor 320 are connected in series between a high-potential-side power supply VH and a ground GND (a low-potential-side power supply). The photodiode 310 is composed of, for example, a PIN diode, and is reverse-biased. The photodiode 310 can be formed with a process of forming a semiconductor region, a process of forming an N-type region, and a process of forming a P-type region. Therefore, the photodiode can be formed on the element substrate using the same process as forming the TFTs constituting the pixel circuit P1, the scanning line driving circuit, and the data line driving circuit. In addition, the photodiode 310 outputs a current IL according to the luminance of the environmental light. One terminal of the switching element 330 is connected to a node Q serving as a connection point between the photodiode 310 and the capacitor 320, and the other terminal of the switching element is connected to the ground GND. An electric charge is accumulated in the capacitor 320 by the current IL, and the potential of the node Q increases. However, when the switching element 330 is turned on, the accumulated electric charge is discharged, so that the potential of the node Q becomes a ground level.

The switching element 330 is composed of a TFT. The switching element 330 is turned on when a reset signal RESET supplied to a gate electrode of the TFT becomes active (a high level), and is turned off when the reset signal RESET becomes inactive (a low level). The node Q is connected to an input terminal of the NAND circuit 340, and a reference signal REF is supplied to the other input terminal of the NAND circuit 340. The cycle of the reference signal REF is shorter than that of the reset signal RESET. An output signal of the NAND circuit 340 is output as a pulse signal 300*a* through three inverters 350, 360, and 370.

Figure 3:
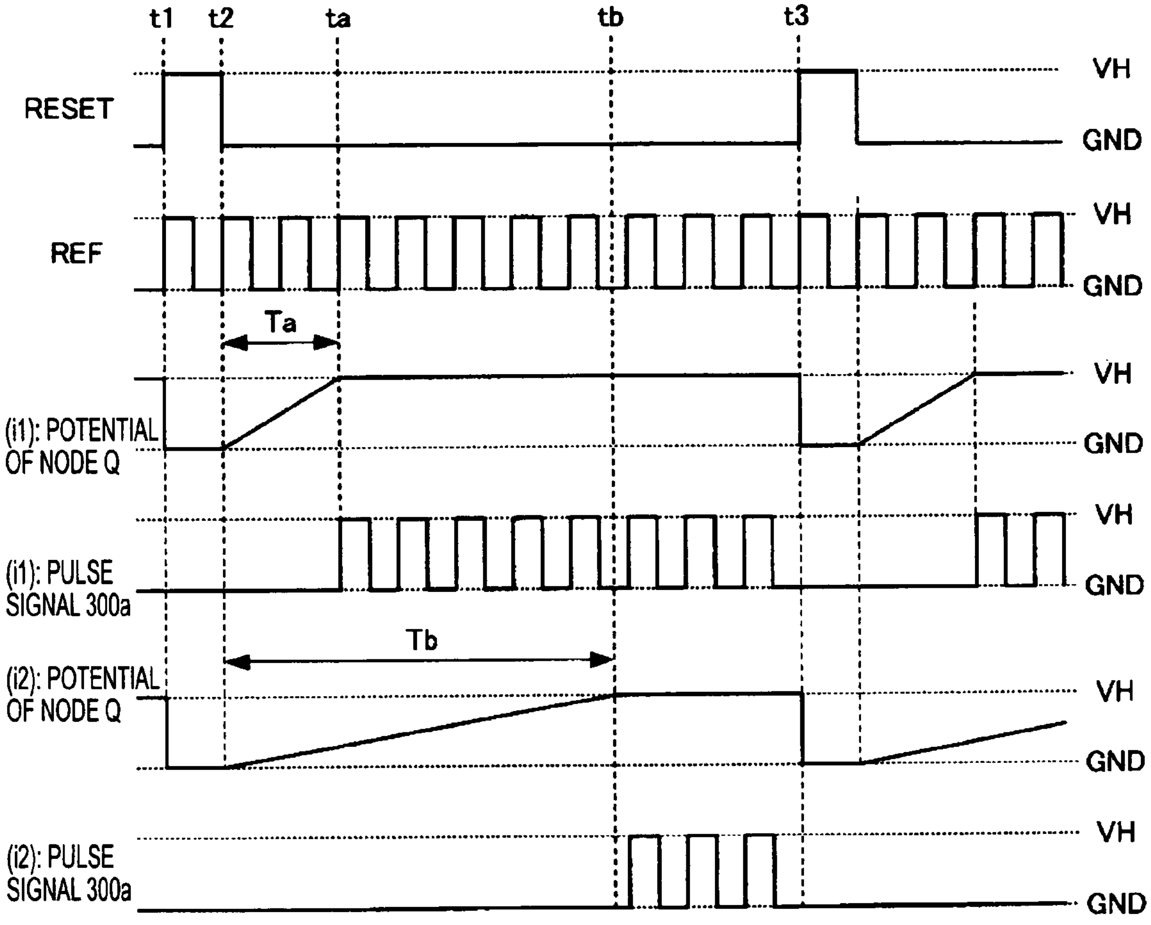
FIG. 3 is a timing chart illustrating the operation of the photo detection circuit.

FIG. 3 is a timing chart of a photo detection circuit 300. In this example, a value of the current IL output from the photodiode 310 at high luminance is denoted by i1, and a value of the current IL output from the photodiode 310 at low luminance is denoted by i2. When the reset signal RESET becomes active during a period of time from a time t1 to a time t2, the switching element 330 is turned on, so that both terminals of the capacitor 320 are short-circuited. As a result, the potential of the node Q becomes a ground level. In addition, the switching element 330 is turned off at the time t2, thereby initiating charging with respect to the capacitor 320. For this reason, the potential of the node Q increases from the time t2. In this case, the capacitor 320 is charged with a constant current, so that a waveform of the potential change of the node Q becomes a straight line. In addition, a gradient of the potential waveform increases when the current value increases. In the present example, i1 is greater than i2, so that a rising time Ta becomes shorter than a rising time Tb.

The NAND circuit 340 serves as a logic circuit that executes logical multiplication between the potential of the node Q and the reference signal REF. For this reason, when the value of the current IL is i1, a pulse signal 300*a* is output during a period of time from the time ta to the time t3, and the pulse signal 300*a* is output during a period of time from the time tb to the time t3 when the value of the current IL is i2. In this case, when the number of pulse signals 300*a* generated during the period of time from the time t2 to the time t3 is compared for the current value, the number of pulse signals is 8 in a case in which the current value is i1, and the number of pulse signals is 3 in a case in which the current value is i2. The current value i1 is a value of the current IL obtained when environmental luminance is high, and the current value i2 is a value of the current IL obtained when environmental luminance is low. Accordingly, the frequency of the pulse signal 300*a* becomes an index of the environmental luminance, so that the frequency increases when the luminance increases. Specifically, the photo detection circuit 300 outputs as the frequency signal the pulse signal 300*a* indicating the environmental luminance. Although simply shown in FIG. 3, the pulse signal 300*a* is actually output at the point of time when the potential of the node Q reaches an operating point of the NAND circuit 340.

A value of the current output from a photoelectric transducer, such as a photodiode 310, is extremely small. A resistor may be used for converting a current into a voltage; however, it is required to form a resistor having a high resistance value in order to extract a voltage signal from a minute current. The occupied area of such a resistor causes a problem in the circuit layout. Furthermore, the resistor serves as an antenna, so that noise may be mixed, which makes it difficult to detect the luminance accurately. According to the present embodiment, the current IL is integrated using the capacitor 320 to be converted to a voltage signal, so that it is possible to accurately detect the luminance with a small occupied area. Furthermore, since the luminance is detected as a frequency by supplying the reference signal REF from the exterior, the noise margin is enhanced, so that the signal can be readily handled. The resultant pulse signal 300*a* is supplied to the counter circuit 400 shown in FIG. 1.

Figure 4:
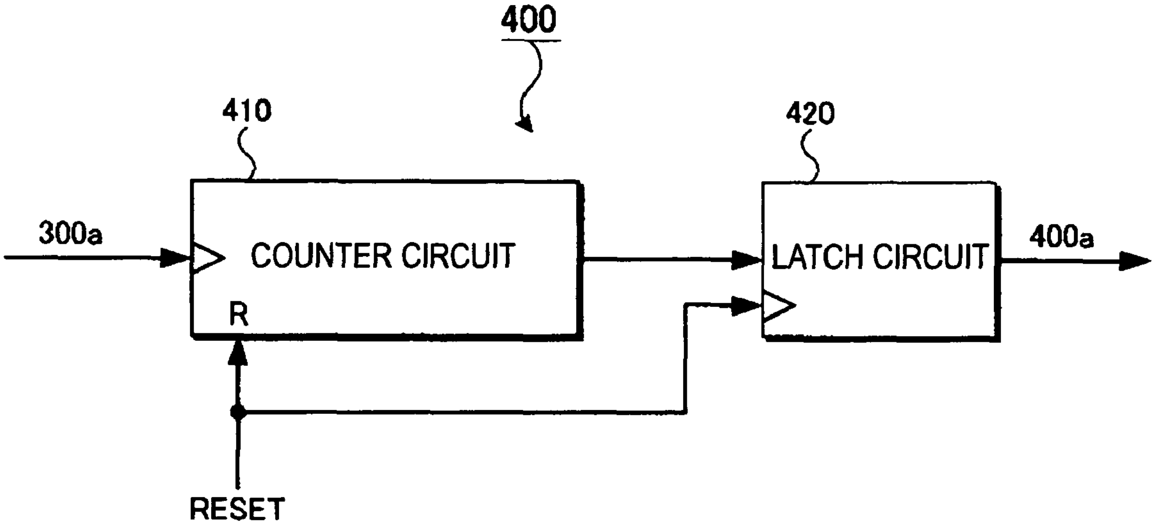
FIG. 4 is a block view illustrating an example of the structure of a counter circuit 400 of the electro-optical device.

FIG. 4 shows an example of the structure of the counter circuit 400. The counter circuit 400 includes a counter circuit 410 whose count value is reset by the reset signal RESET, and a latch circuit 420 for latching counter data indicating the counting result of the counter circuit 410 by the reset signal RESET. Output data of the latch circuit 420 are output to the dimmer circuit 500 as luminance data 400*a*.

Figure 5:
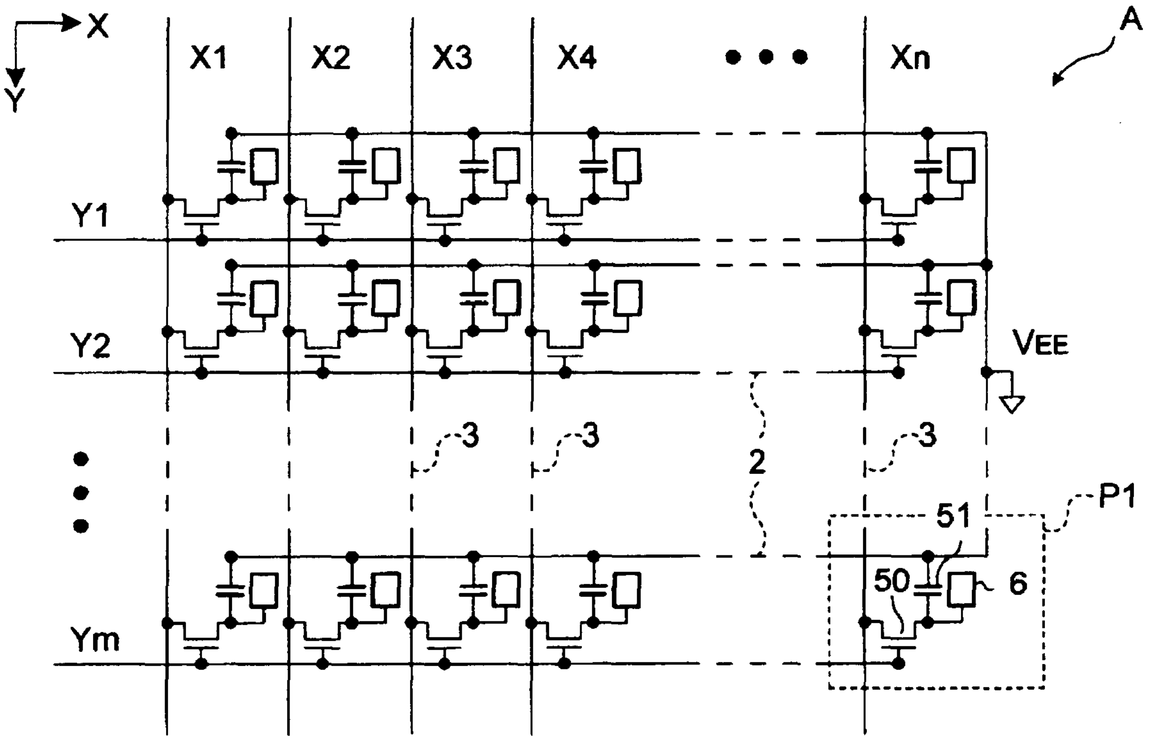
FIG. 5 is a circuit diagram illustrating an example of the structure of an image display region A of the electro-optical device.

Next, the image display region A will be described. In the image display region A, m (m is a natural number not less than 2) scanning lines 2 are arranged parallel to each other in an X direction while n (n is a natural number not less than 2) data lines 3 are arranged parallel to each other in a Y direction, as shown in FIG. 5. A gate electrode of the TFT 50 is connected to the scanning line 2, a source electrode of the TFT 50 is connected to the data line 3, and a drain electrode of the TFT 50 is connected to a pixel electrode 6 in a region near an intersection between each scanning line 2 and each data line 3. In addition, each pixel includes the pixel electrode 6, a counter electrode (to be described later) formed on the counter substrate, and liquid crystal held between both of the electrodes. As a result, the pixels are arranged in a matrix to correspond to intersections of the scanning lines 2 and the data lines 3.

In addition, scanning signals Y1, Y2, . . . , and Ym are line-sequentially applied in a pulse manner to the respective scanning lines 2 each connected to the gate electrode of the TFT 50. Accordingly, when a scanning signal is supplied to any scanning line 2, the TFT 50 connected to the corresponding scanning line is turned on. Therefore, data signals X1, X2, . . . , and Xn supplied from the data lines 3 at predetermined timings are sequentially written in the corresponding pixels and are then held for a predetermined period.

The alignment or order of the liquid crystal molecules is changed in accordance with a voltage level applied to each pixel, so that gray-scale display can be achieved by optical modulation. For example, the amount of light transmitted through liquid crystal decreases as the applied voltage increases in the case of a normally white mode and increases as the applied voltage increases in the case of a normally black mode, so that light having a contrast according to the image signal is emitted for each pixel in the entire electro-optical device 1. Accordingly, predetermined display can be made.

In addition, in order to prevent the held image signal from leaking, a storage capacitor 51 is additionally provided so as to be parallel to a liquid crystal capacitor formed between the pixel electrode 6 and the counter electrode. For example, a voltage of the pixel electrode 6 is held in the storage capacitor 51 for a time three orders of magnitude longer than the time for which the source voltage is applied, so that the holding characteristics are improved, which results in a high contrast ratio.

Figure 6:
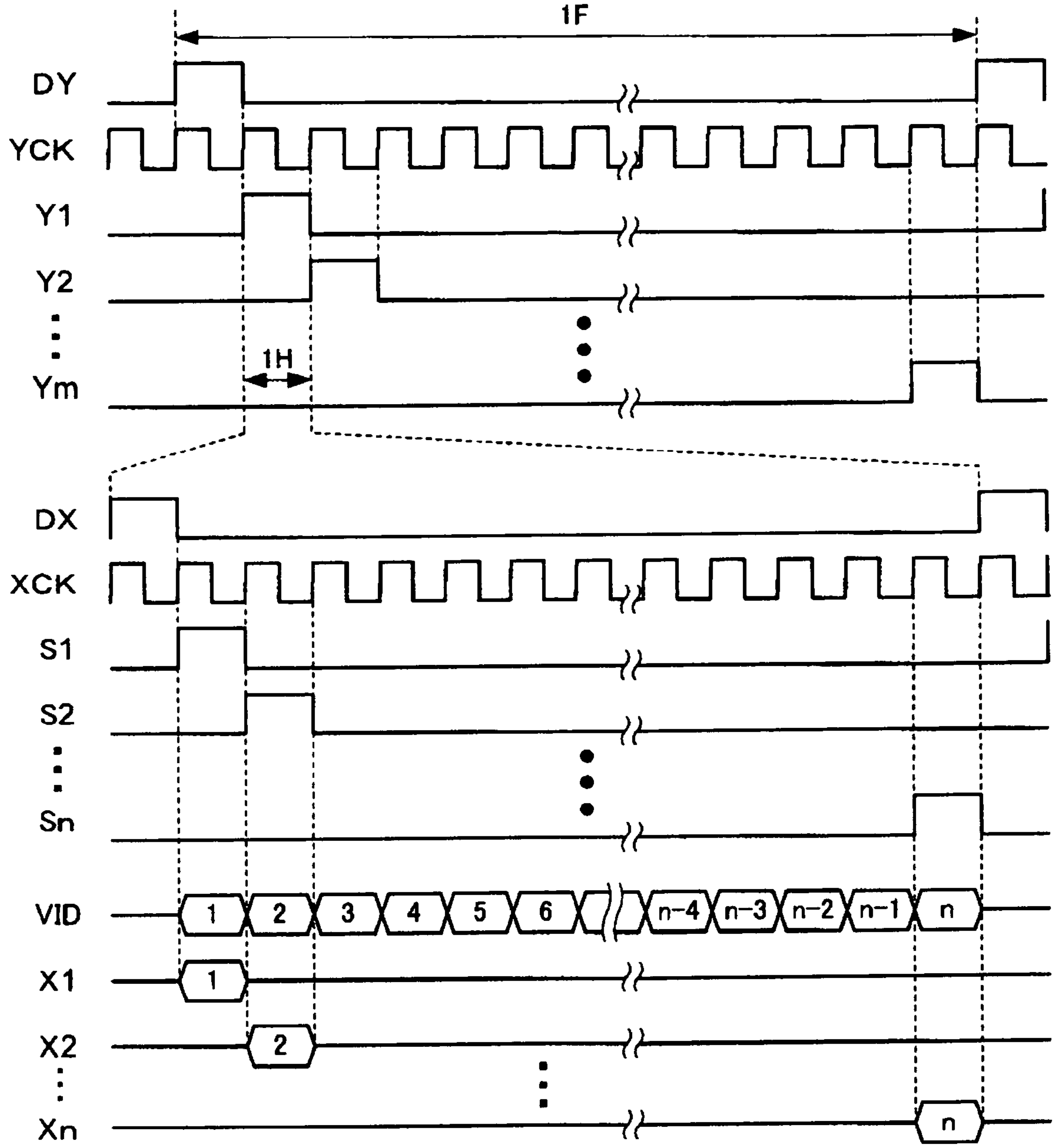
FIG. 6 is a timing chart illustrating the operation of a scanning line driving circuit 100 and a data line driving circuit 200 of the electro-optical device.

FIG. 6 shows a timing chart of the scanning line driving circuit 100 and the data line driving circuit 200. The scanning line driving circuit 100 generates scanning signals Y1, Y2, . . . , and Ym by sequentially shifting a Y transfer start pulse DY of one frame (1F) cycle in accordance with a Y clock signal YCK. The scanning signals Y1 to Ym become sequentially active in each horizontal scanning period 1H. The data line driving circuit 200 transmits an X transfer start pulse DX of the horizontal scanning period in accordance with an X clock signal XCK to internally generate sampling signals S1, S2, . . . , and Sn. In addition, the data line driving circuit 200 samples the image signals VID using the sampling signals S1, S2, . . . , and Sn to generate data signals X1, X2, . . . , and Xn.

In the present embodiment, the light-emitting luminance of the backlight 600 is adjusted using the photo detection circuit 300, so that the screen brightness can be controlled according to the environmental luminance, thereby allowing the power consumption of the electro-optical device 1 to be reduced. In addition, the photo detection circuit 300 and the counter circuit 400 are formed in the liquid crystal panel AA using TFTs or the like, so that it is possible to make the electro-optical device 1 significantly small. Furthermore, the photo detection circuit 300 makes the capacitor 320 charged with the current IL of the photodiode 310 extract a signal according to the environmental luminance, so that it is possible to accurately detect the luminance. In addition, a final output signal of the photo detection circuit 300 is given as a pulse signal 300*a*, so that the luminance data 400*a* can be simply obtained by measuring the number of pulses per unit time.

Second Embodiment

Next, an electro-optical device 1 according to a second embodiment of the invention will be described. The electro-optical device 1 according to the second embodiment has the same structure as the electro-optical device according to the first embodiment, except that a Y transfer start pulse DY instead of the reset signal RESET is used and a Y clock signal YCK instead of the reference signal REF is used.

Figure 7:
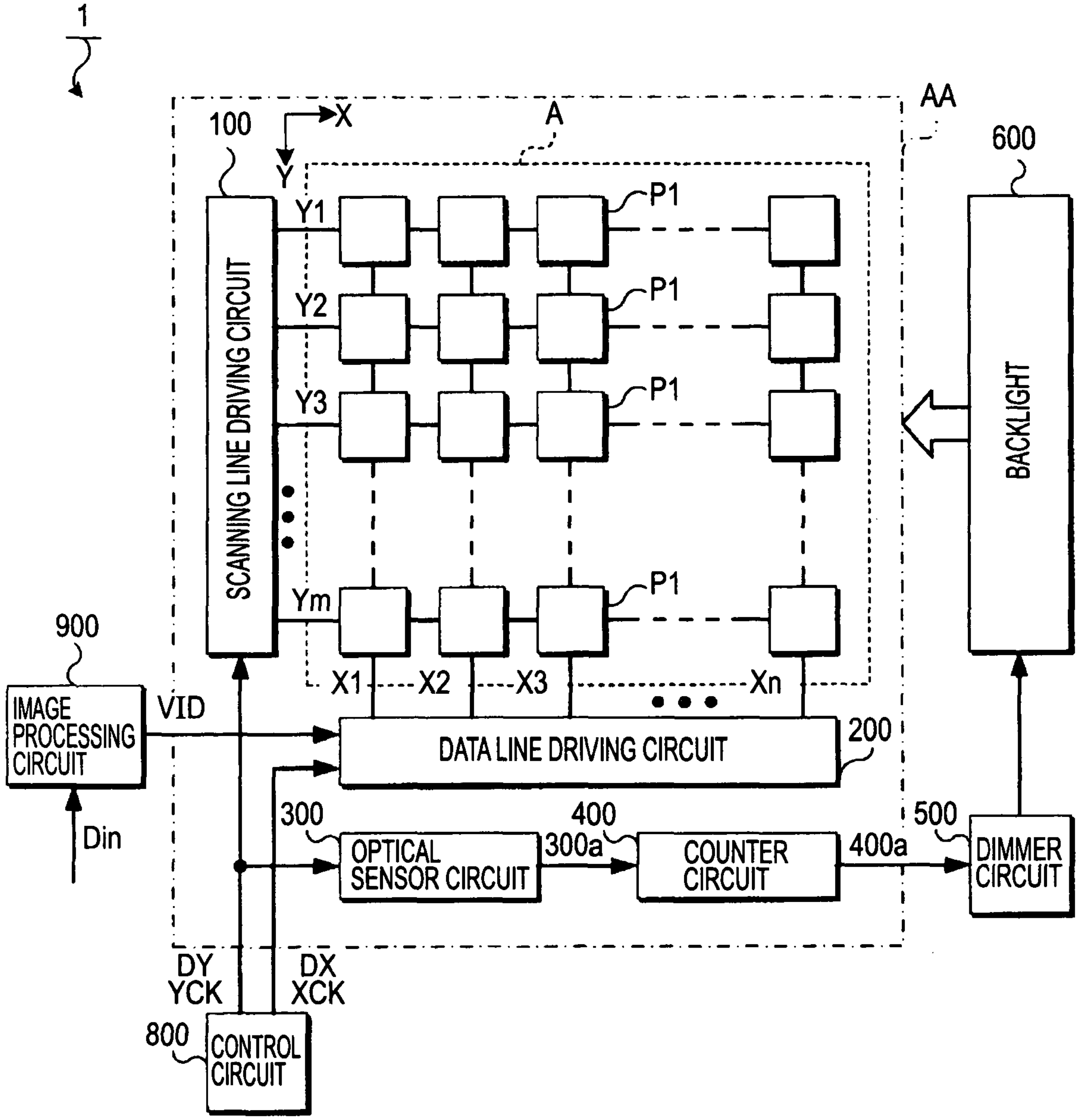
FIG. 7 is a block view illustrating the entire structure of an electro-optical device 1 according to a second embodiment of the present invention.

FIG. 7 shows the structure of the electro-optical device 1 according to the second embodiment. A signal generating circuit 700 is omitted in the electro-optical device 1 according to the second embodiment, as shown in FIG. 7. This is because the Y transfer start pulse DY serves as the reset signal RESET and the Y clock signal YCK serves as the reference signal REF. Furthermore, the X transfer start pulse DX may be used instead of the reset signal RESET, and the X clock signal XCK may be used instead of the reference signal REF. That is, various signals for driving the pixel circuits P1 may serve as the reset signal RESET and the reference signal REF.

However, the Y clock signal YCK has a frequency lower than the X clock signal XCK, so that it is preferable to use the Y transfer start pulse DY and the Y clock signal YCK instead of the reset signal RESET and the reference signal REF in terms of reducing the power consumption. In addition, a change of the environmental luminance is sufficiently long as compared to one frame period which is the cycle of the Y transfer start pulse DY, so that the light-emitting luminance of the backlight 600 can be adjusted according to the change of environmental luminance even when the Y transfer start pulse DY and the Y clock signal YCK are used.

In the present embodiment as described above, various signals for driving the pixel circuits P1 serve as the reset signal RESET and the reference signal REF, so that it is not necessary to generate a specific signal for operating the photo detection circuit 300. As a result, the signal generating circuit 700 can be omitted to make its structure simple. In addition, it is not necessary to provide an input terminal for supplying the reset signal RESET and the reference signal REF to the liquid crystal panel AA, thereby capable of coping with the narrow pitch of the input terminal.

Third Embodiment

Next, an electro-optical device 1 according to a third embodiment of the invention will be described. The electro-optical device 1 according to the third embodiment has the same structure as the electro-optical device 1 according to the second embodiment shown in FIG. 7, except that a pixel circuit P2 instead of the pixel circuit P1 is used and an image processing circuit 910 instead of the image processing circuit 900 is used.

Figure 8:
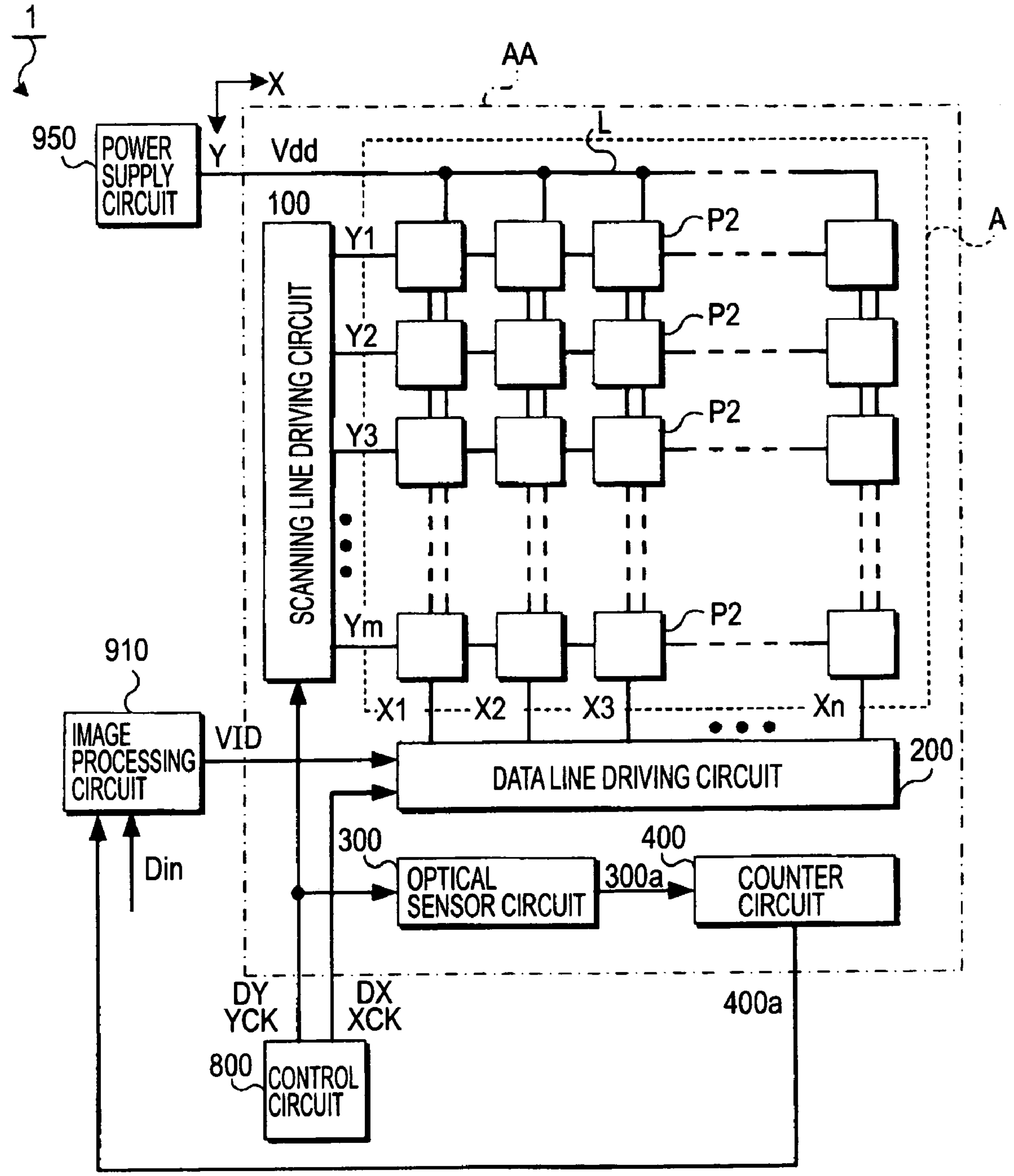
FIG. 8 is a block view illustrating the entire structure of an electro-optical device 1 according to a third embodiment of the present invention.

FIG. 8 shows the structure of an electro-optical device 1 according to the third embodiment. The pixel circuit P2 includes a light-emitting element serving as an electro-optical element. Specifically, it includes an organic light-emitting diode (hereinafter, referred to as an OLED). The OLED element is different from a liquid crystal element that changes an amount of transmitting light, and a current-driving-type light-emitting element that emits light itself. A power supply circuit 950 supplies a power supply Vdd for driving the OLED element to each pixel circuit P2.

In addition, the luminance data 400*a* output from the counter circuit 400 are supplied to the image processing circuit 910. The image processing circuit 910 controls a level of an image signal VID in accordance with a luminance data 400*a*. Specifically, the image processing circuit 910 increases a level of the image signal VID when the environmental luminance increases. In contrast, when the environmental luminance decreases, the image processing circuit decreases a level of the image signal VID. When the level of the image signal VID decreases, levels of data signals X1 to Xn decrease, so that the light-emitting luminance of the OLED element decreases. Since the OLED element emits light with the luminance according to a driving current, it is possible to control the brightness of the entire screen in accordance with the environmental luminance. Accordingly, the luminance of the entire screen can increase under natural daylight, so that an image can be displayed so as to see the image easily in a bright environment. In addition, the luminance of the entire screen can decrease to reduce the power consumption in a dark environment at night.

Figure 9:
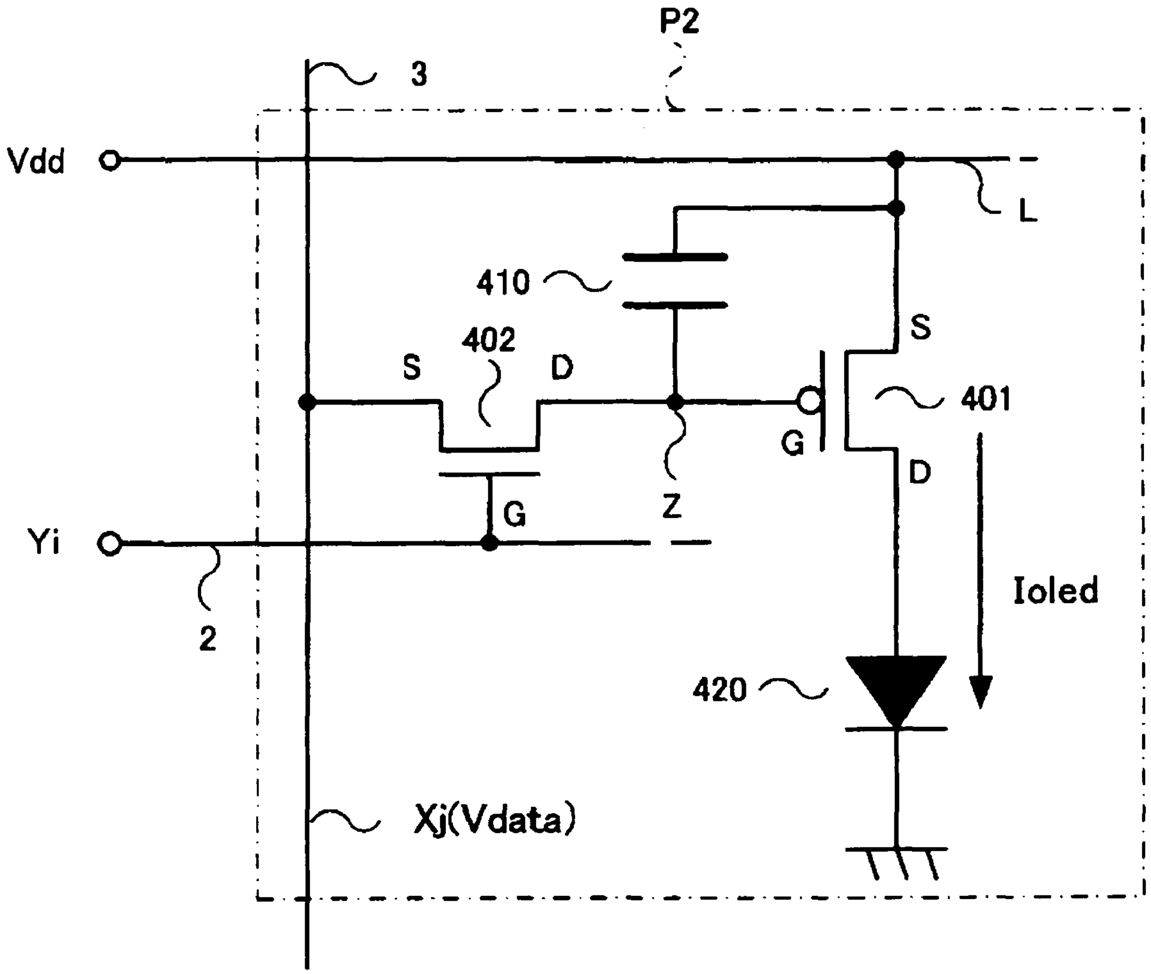
FIG. 9 is a circuit diagram of a pixel circuit P2 used in the electro-optical device.

FIG. 9 shows a circuit diagram of the pixel circuit P2. As shown in FIG. 9, the pixel circuit P2 is located at the i-th (i is a natural number satisfying $1 \leqq i \leqq m$) row and j-th (j is a natural number satisfying $1 \leqq j \leqq n$) column. In addition, a scanning signal Yi is supplied through the scanning line 2, and a data signal Xj is supplied as a voltage signal Vdata through the data line 3. The pixel circuit P2 has two TFTs 401 and 402, a capacitor element 410, and an OLED element 420. Among these elements, the p channel-type TFT 401 has a source electrode connected to a power supply line L and a drain electrode connected to an anode of the OLED element 420. In addition, a capacitor element 410 is provided between the source electrode and gate electrode of the TFT 401. The TFT 402 has a gate electrode connected to the scanning line 101, a source electrode connected to the data line 103, and a drain electrode connected to the gate electrode of the TFT 401.

In such the structure, when the scanning signal Yi becomes a H level, the n channel-type TFT 402 is turned on, so that a voltage of a connection point Z becomes equal to the voltage Vdata. In this case, an electric charge corresponding to Vdd−Vdata is accumulated in the capacitor element 410. Next, when the scanning signal Yi becomes an L level, the TFT 402 is turned off. Since input impedance is very high at the gate electrode of the TFT 401, an accumulated state of the electric charge in the capacitor element 410 is not changed. A gate-source voltage of the TFT 401 is held with the voltage (Vdd−Vdata) when the voltage Vdata is applied. The driving current Ioled flowing into the OLED element 420 is determined by the gate-source voltage of the TFT 401, so that the driving current Ioled according to the voltage Vdata flows.

Furthermore, in the present embodiment, the Y transfer start pulse DY and the Y clock signal YCK are used instead of the reset signal RESET and the reference signal REF in the same manner as the second embodiment. However, like the first embodiment, the signal generating circuit 700 may be provided, so that the reset signal RESET and the reference signal REF may be supplied to the photo detection circuit 300.

Fourth Embodiment

Figure 10:
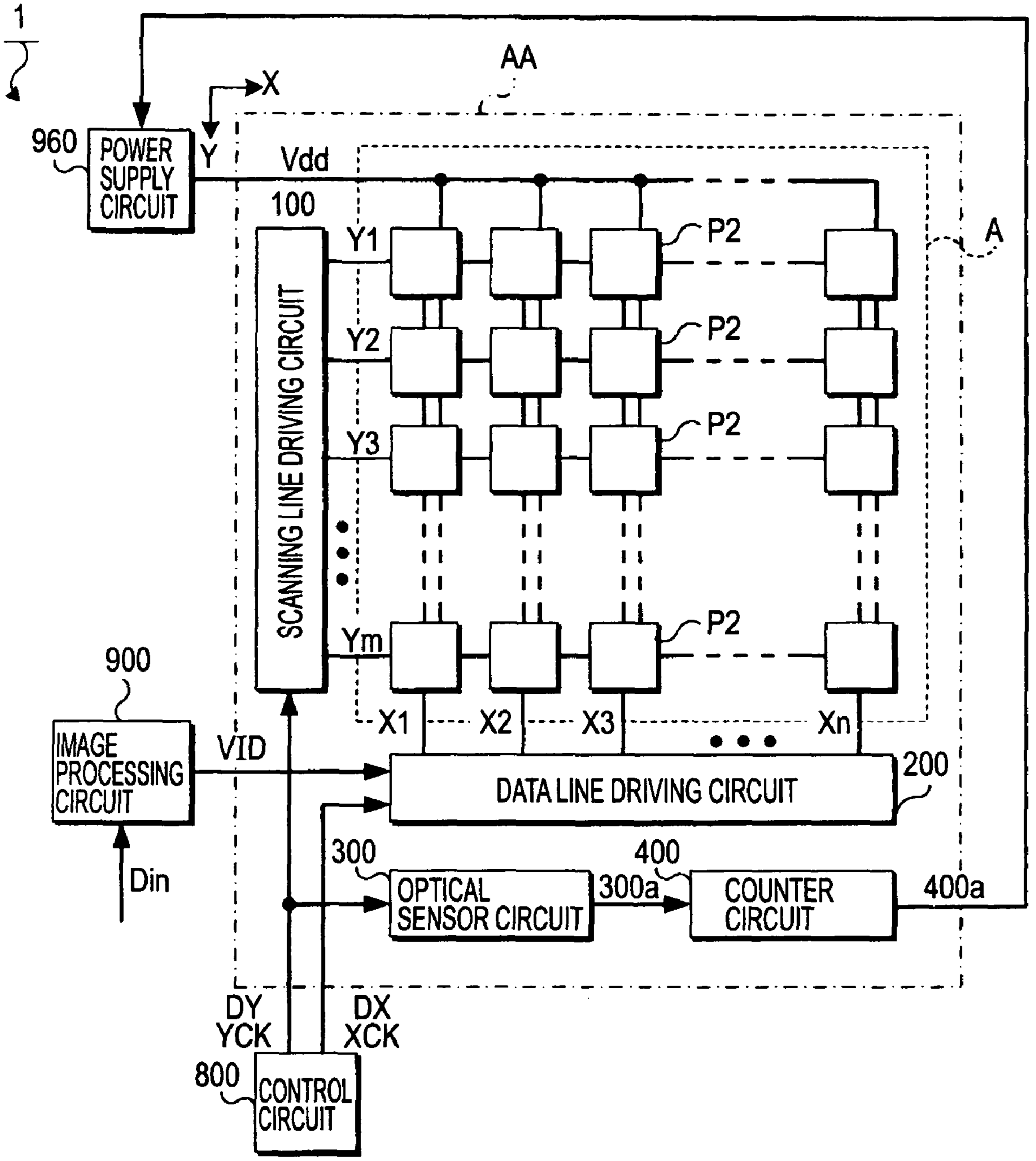
FIG. 10 is a block view illustrating the entire structure of an electro-optical device 1 according to a fourth embodiment of the present invention.

FIG. 10 shows the structure of an electro-optical device 1 according to a fourth embodiment of the invention. The electro-optical device 1 according to the fourth embodiment has the same structure as the electro-optical device 1 according to the third embodiment shown in FIG. 8, except that a power supply circuit 960 is used instead of the power supply circuit 950. Luminance data 400*a* output from a counter circuit 400 are supplied to the power supply circuit 960 in this electro-optical device 1. As described above, the current Ioled flowing into the OLED element 420 is determined by 'Vdd−Vdata'. Accordingly, it is possible to control the luminance of the entire screen according to environmental luminance by adjusting the power supply voltage Vdd in accordance with the luminance data 400*a*. Specifically, the power supply voltage Vdd is controlled to become higher when the environmental luminance increases. Accordingly, the luminance of the entire screen can increase in natural daylight, so that it is possible to display an image to be easily seen in a bright environment, and the luminance of the entire screen can also decrease to reduce the power consumption in a dark environment at night.

Modification

The invention is not limited to the above-described embodiments, and various modifications may be made as follows.

(1) The liquid crystal element and the OLED element are employed as an example of the electro-optical device in the above-describe embodiments. However, the invention can also be applied to the electro-optical device using an electro-optical element other than the liquid crystal element and the OLED element. The electro-optical device is an element in which optical characteristics, such as transmittance or luminance, are changed by supplying an electrical signal (a current signal or a voltage signal). For example, as is done in the above-described embodiments, the invention can also be applied to various electro-optical devices, such as a display panel using a light-emitting element like an inorganic electroluminescent (EL) element or a light-emitting polymer, an electrophoresis display panel using as an electro-optical material a microcapsule including a colored liquid and white particles dispersed in the colored liquid, a twist ball display panel using as an electro-optical material a twist ball in which regions having different polarities are divided by different colors, a toner display panel using a black toner as an electro-optical material, and a plasma display panel using a high pressure gas like helium or neon as an electro-optical material.

(2) The pixel circuit P2 in the above-mentioned third and fourth embodiments is a voltage driving type in which a voltage signal is input as a data signal, however, it may be a current driving type in which a current signal is input as the data signal.

(3) In the respective embodiments, the photo detection circuit 300 outputs the pulse signal 300*a*, however, it may output the potential of the node Q as the voltage signal. An effective value of the voltage signal is a value according to the luminance. Accordingly, the dimmer circuit 500 can control the light-emitting luminance of the backlight 600 based on the voltage signal. In addition, the image processing circuit 910 can adjust a level of the image signal VID based on the voltage signal. Furthermore, the power supply circuit 960 can adjust the power supply voltage Vdd based on the voltage signal.

In addition, in the above-described embodiments, the counter circuit 400 as well as the photo detection circuit 300 may also be included in the photo detection circuit detecting the environmental luminance.

Electronic Apparatus

Figure 11:
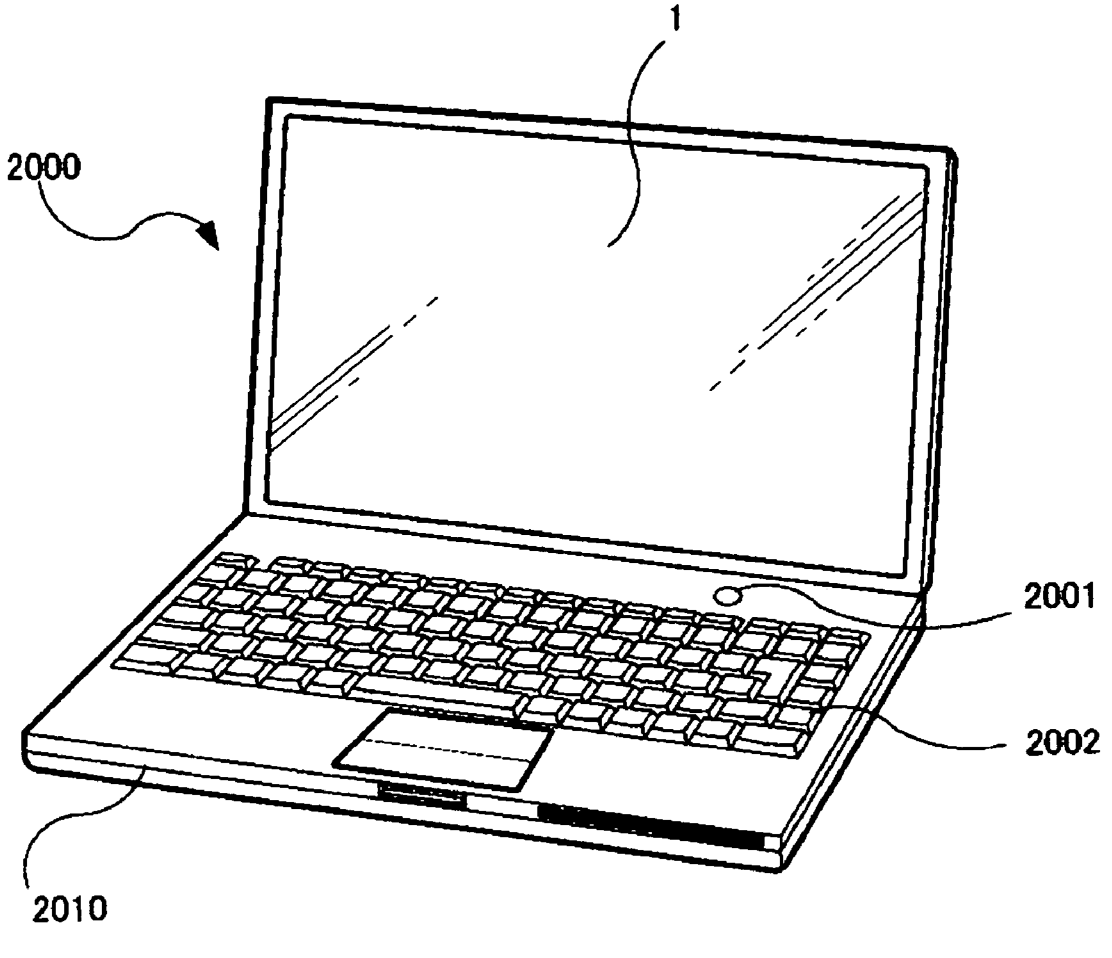
FIG. 11 is a perspective view illustrating the structure of a personal computer, which is an example of an electronic apparatus to which the electro-optical device 1 is applied.

Next, an electronic apparatus to which the electro-optical device 1 according to the above-described embodiments and the modification is applied will be described. FIG. 11 shows the structure of a mobile personal computer to which the electro-optical device 1 is applied. A personal computer 2000 has an electro-optical device 1 serving as a display unit and a main body 2010. The main body 2010 has a power supply switch 2001 and a keyboard 2002.

Figure 12:
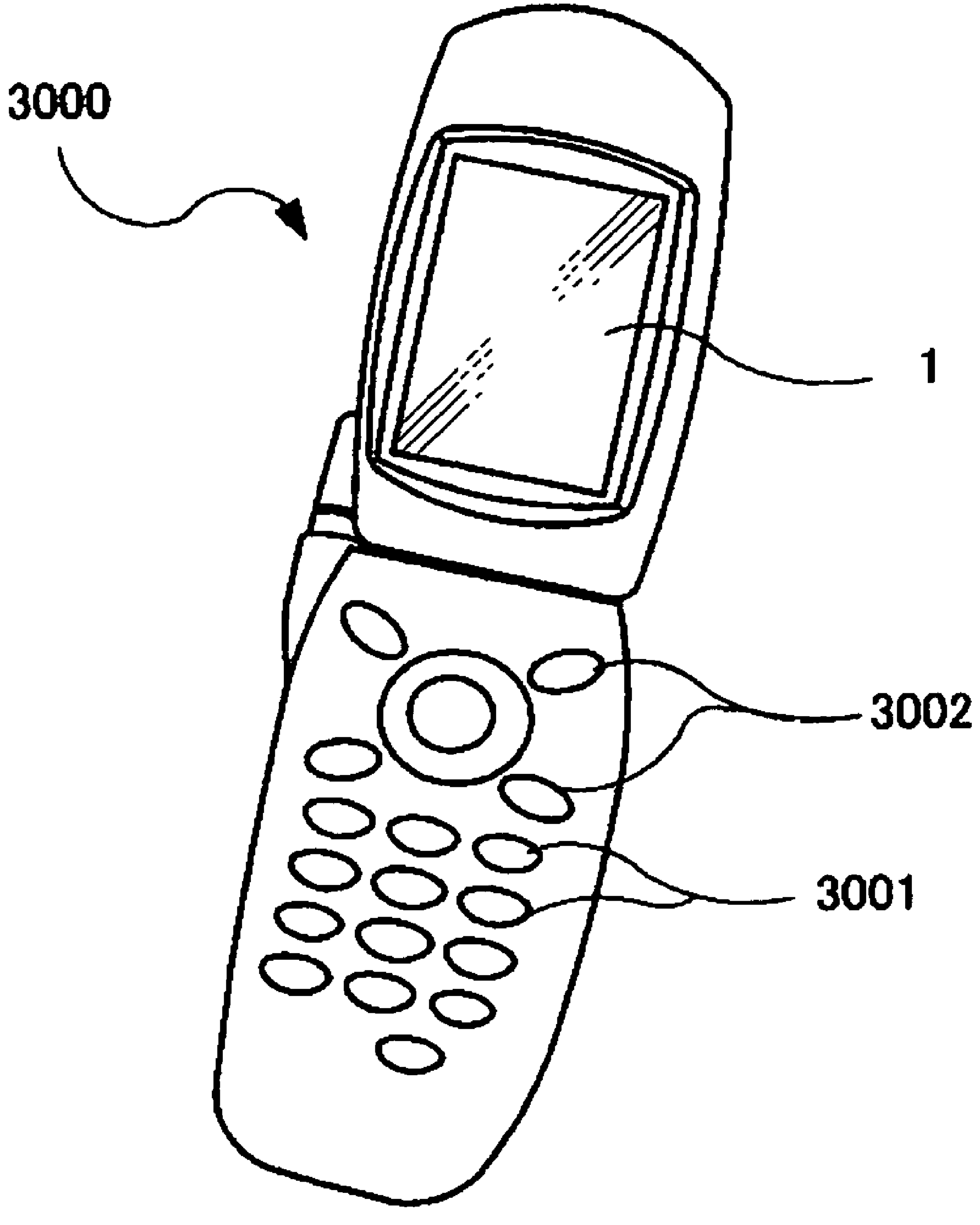
FIG. 12 is a perspective view illustrating the structure of a cellular phone, which is an example of an electronic apparatus to which the electro-optical device 1 is applied.

FIG. 12 shows the structure of a cellular phone to which the electro-optical device 1 is applied. A cellular phone 3000 has a plurality of operating buttons 3001, scroll buttons 3002, and an electro-optical device 1 serving as a display unit. A screen displayed on the electro-optical device 1 is scrolled by operating the scroll buttons 3002.

Figure 13:
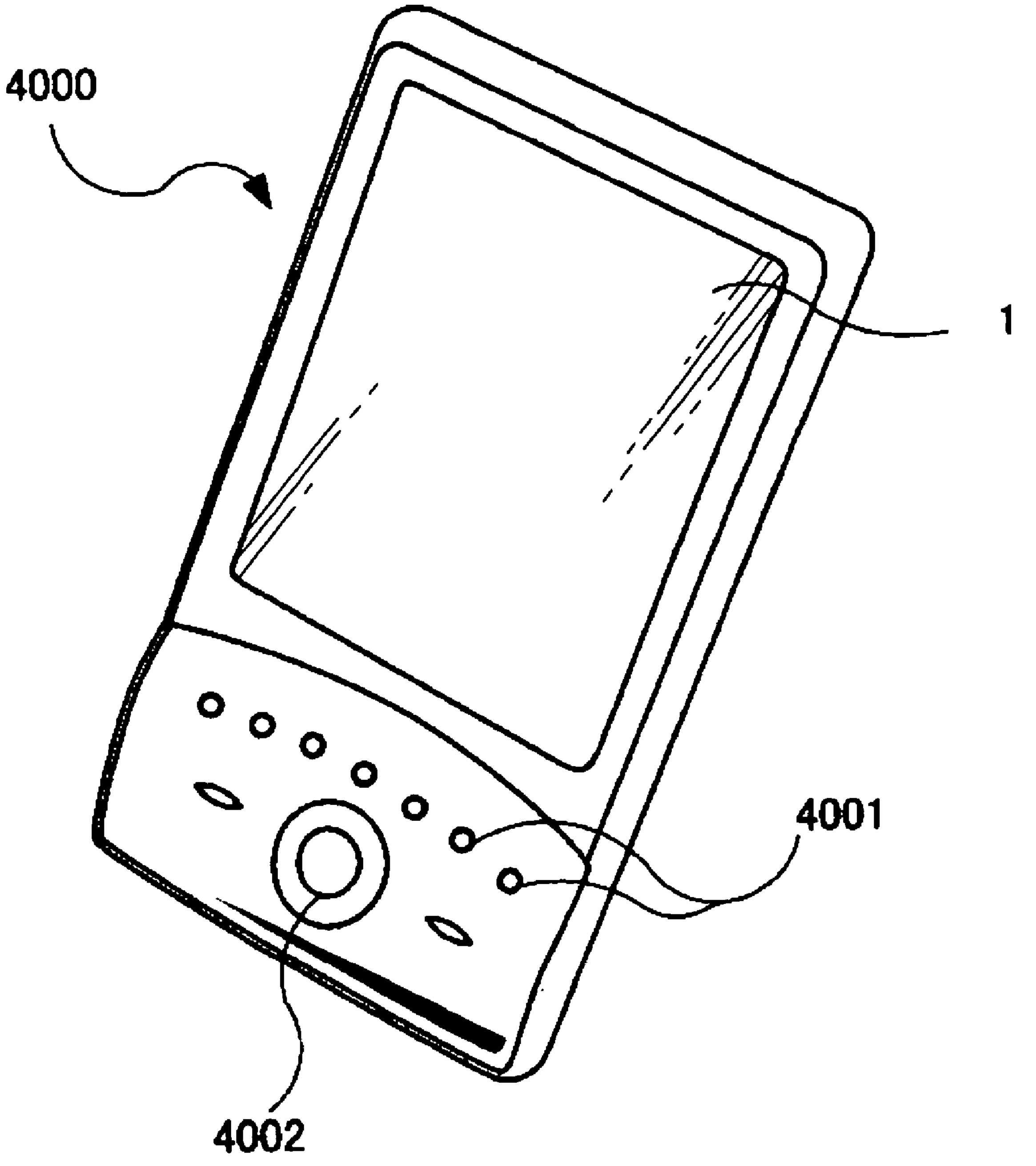
FIG. 13 is a perspective view illustrating the structure of a personal digital assistance, which is an example of an electronic apparatus to which the electro-optical device 1 is applied.

FIG. 13 shows the structure of a personal digital assistant (PDA) to which the electro-optical device 1 is applied. The PDA 4000 has a plurality of operating buttons 4001, a power supply switch 4002, and the electro-optical device 1 serving as a display unit. When the power supply switch 4002 is operated, various information, such as address lists or schedules, are displayed on the electro-optical device 1.

Furthermore, examples of an electronic apparatus to which the electro-optical device 1 is applied may include, a digital still camera, a liquid crystal television, a view-finder-type or monitor-direct-view-type video tape recorder, a car navigation device, a pager, an electronic note, a calculator, a word process, a workstation, a video phone, a point of sale (POS) terminal, an apparatus having a touch panel and so forth, in addition to the examples shown in FIGS. 11 to 13. In addition, the above-described electro-optical device 1 can be applied as display units of these various electronic apparatuses.

What is claimed is:

1. A photo detection circuit comprising:

a photodiode whose cathode is connected to a high-potential-side power supply and whose anode is connected to a connection point;

a capacitor element provided between the connection point and a low-potential-side power supply; and a switching element, provided between the connection point and the low-potential-side power supply, that switches on and off based on a repeating reset pulse signal, the repeating reset pulse signal repeating with a first predetermined frequency, and an output circuit converting a voltage signal of the connection point into a plurality of pulse signals having a second predetermined frequency and outputting the plurality of pulse signals only while the voltage signal of the connection point is substantially equal to a voltage of the high-potential-side power supply and until the switching element is turned on, the switching on and off of the switching element corresponding with the repeating reset pulse signal supplied to the photo detection circuit, the repeating reset pulse signal having a pulse width equal to one full cycle of one pulse signal of the plurality of pulse signals that includes a high pulse and an adjacent low pulse.

2. The photo detection circuit according to claim 1, further comprising:

a voltage-to-frequency converting circuit that converts the voltage signal into a frequency signal, wherein the frequency signal is output instead of the voltage signal as the output signal.

3. The photo detection circuit according to claim 2, wherein the voltage-to-frequency converting circuit has a logic circuit that executes logical multiplication between the voltage signal and a reference signal, the voltage-to-frequency converting circuit having a frequency greater than the on/off frequency of the switching element to output a binarization signal, and the binarization signal is output as the frequency signal.

4. The photo detection circuit according to claim 3, further comprising:

a counting unit that counts the binarization signal to output a count data signal indicating a result of counts per unit time, wherein the count data signal is output as the output signal.

5. An electro-optical panel comprising:

the photo detection circuit according to claim 1;

a plurality of data lines;

a plurality of scanning lines;

a plurality of pixel circuits provided to correspond to intersections of the data lines and the scanning lines, and each having an electro-optical element having an optical characteristic changed by an electrical effect; and a driving circuit that outputs a signal to at least one of the plurality of data lines and the plurality of scanning lines to drive the electro-optical element.

6. An electro-optical device comprising:

an electro-optical panel according to claim 5;

a light source that radiates light from one surface of the electro-optical panel toward the other surface; and a dimmer circuit that adjusts an amount of light emitted from the light source based on the output signal of the photo detection circuit, wherein the electro-optical element is a liquid crystal element whose transmittance is changed according to an applied voltage.

7. An electro-optical device comprising:

the electro-optical panel according to claim 5; and an image processing circuit that outputs an image signal whose level is adjusted based on the output signal of the photo detection circuit, wherein the electro-optical element is composed of a light-emitting element that emits light with a luminance according to a driving current, and the driving circuit controls the driving current based on the image signal output from the image processing circuit.

8. An electro-optical device comprising:

an electro-optical panel according to claim 5; and a power supply circuit that outputs a power supply voltage whose level is adjusted based on the output signal of the photo detection circuit, wherein the driving circuit outputs to the data line a data signal according to a gray-scale level to be displayed, the electro-optical element is composed of a light-emitting element for emitting light with a luminance according to a driving current, the pixel circuit has a driving transistor for supplying the driving current to the light-emitting element, and the driving transistor supplies to the light-emitting element a driving current having a level based on the power supply voltage and the data signal.

9. An electronic apparatus comprising the electro-optical panel according to claim 5.

10. The photo detection circuit according to claim 1, wherein each of the photodiode, capacitor element and switching element are directly connected to the connection point.

* * * * *